Figure 5:
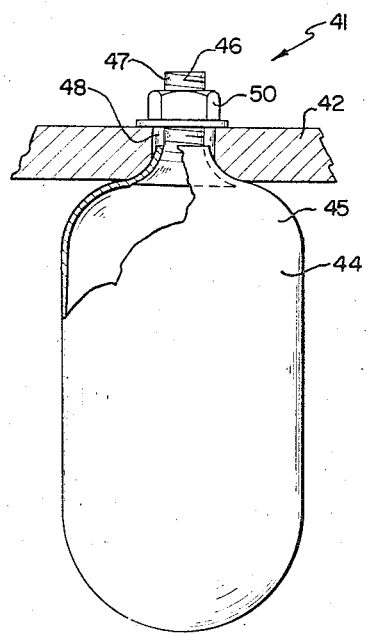

April 11, 1967 R. H. FERGUSON 3,313,263
TRACK APPARATUS FOR CRAWLER TYPE VEHICLES
Filed Oct. 11, 1965 2 Sheets-Sheet 1
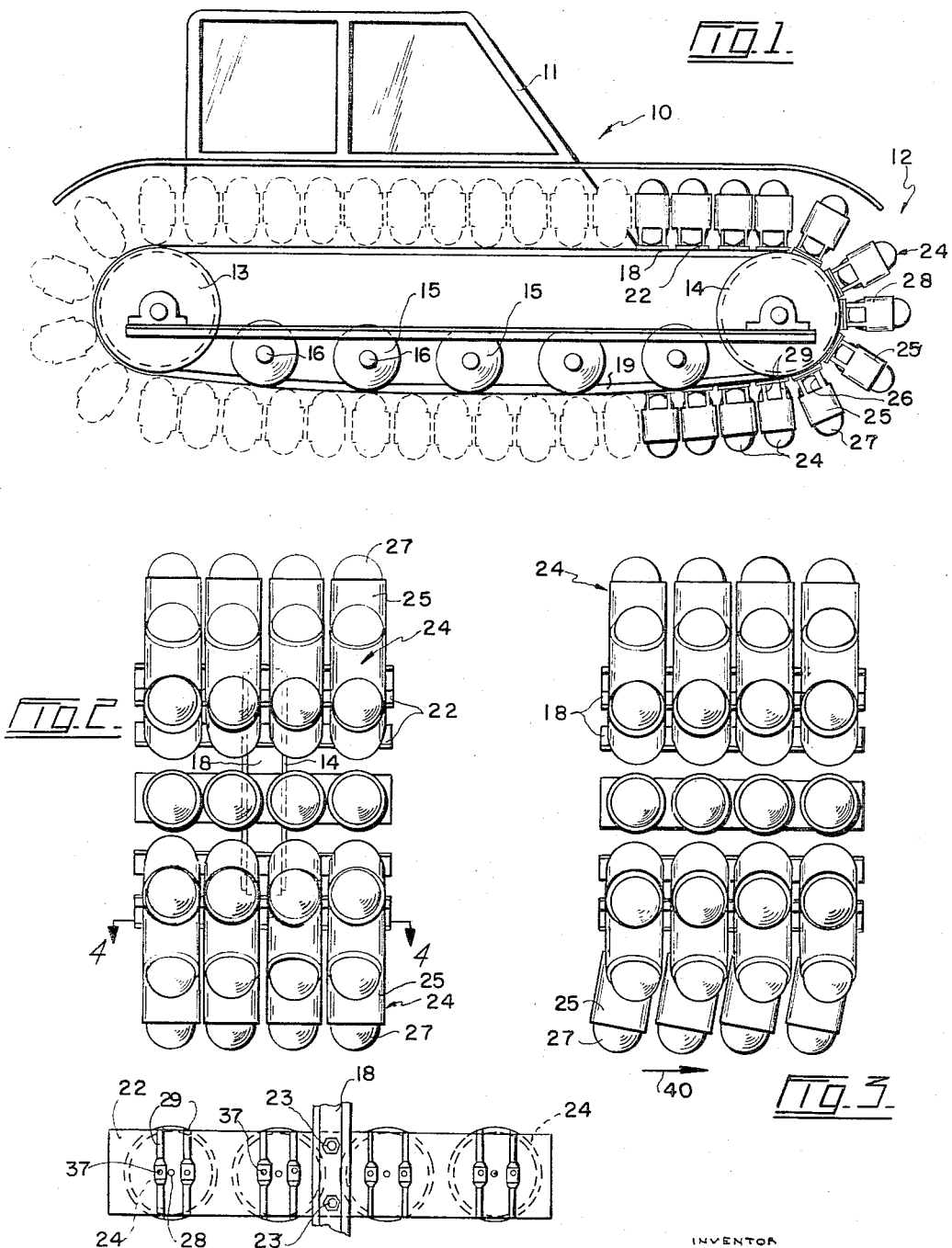
INVENTOR
ROYDEN H. FERGUSON
BY
Fetherstonhaugh & Co.
ATTORNEYS United States Patent Office 3,313,263
Patented Apr. 11, 1967

3,313,263
TRACK APPARATUS FOR CRAWLER TYPE
VEHICLES
Royden H. Ferguson, 3688 Marine Drive, West
Vancouver, British Columbia, Canada
Filed Oct. 11, 1965, Ser. No. 494,570
8 Claims. (Cl. 115—1)

This invention relates to amphibious vehicles and in particular to a track arrangement whereby the vehicle may be supported and propelled both on land and in water.

In the construction of crawler type amphibious vehicles, the endless tracks by means of which the vehicles are propelled and manoeuvred in both water and upon land, have usually been very ruggedly built in order to withstand the abuse to which they are subjected when operating on soft sand or upon rough shingle. This has of necessity required tracks of excessive weight and has therefore resulted in the sacrifice of some of the vehicle's buoyancy, and has also unnecessary weight on the suspension system. The tracks with which most amphibious vehicles are equipped are a series of pivotal link members being interconnected in such a manner as to limit or prevent any lateral movement between adjacent members so that when manoeuvring upon land which requires rotative movement of the vehicle about its central vertical axis, one track may be braked or slowed to permit the other to rotate the vehicle about a central vertical axis. This results in the skidding of the tracks in a horizontal plane about said axis. Where the tracks are of relatively light construction, they will of course be liable to rupture and damage where the vehicle is being used on soft sand or shingle, and the vehicles, therefore, are limited in so far as their manoeuverability on land is concerned.

Some attempts have been to provide tracks having buoyant, inflatable members secured thereto, said members acting as pontoons to lend the craft buoyancy when in water and it having a sufficiently rugged construction to withstand the abuse they must take when the vehicle is manoeuvred upon land. The tracks of this latter type have not in the main been successful in view of the fact that the pontoons have not permitted the flexibility of movement necessary to permit the turning of the vehicle without some sliding movement of the ground engaging portions of the pontoons.

The present invention which is a crawler type vehicle overcomes the objections common in most vehicles of this type by providing each of the crawler tracks with a longitudinally arranged series of individually inflatable and non-interconnected pontoons which not only serve to lend the vehicle buoyancy, but which are laterally and longitudinally deflectable, thereby permitting the vehicle to turn upon land without the accompanying skidding of the supporting tracks upon the supporting surface.

The present invention, by providing a track structure of a flexible nature, greatly reduces the weight inherent in structures of a more rigid design.

The present invention therefore provides a track structure which does not sacrifice buoyancy for strength and which therefore provides easy manoeuverability on land as well as sea worthiness of the amphibious craft.

The track apparatus of the present invention comprises an endless travelling surface, a plurality of individually inflatable members arranged in longitudinally spaced alignment around the surface, each of said members having a convex resilient deformable surface engaging portion, means for individually tethering the inflatable members to said surface for travel therewith, said means being arranged to draw said surface engaging portions into deformed engagement with the surface, thereby yieldably restraining said members against lateral and longitudinal deflection.

Referring to the drawings which illustrate the invention,
FIGURE 1 is a side view of the track apparatus,
FIGURE 2 is an enlarged end view of one track of the apparatus of FIGURE 1, showing the inflatable members in a position of rest,
FIGURE 3 is a view similar to FIGURE 2, illustrating the deflection of said members during a turning movement of the vehicle,
FIGURE 4 is an enlarged plan view of a set of inflatable members taken in the direction 4—4 of FIGURE 2, and
FIGURE 5 is an enlarged front view partially in section of a portion of another embodiment of the invention.

In the construction of crawler type amphibious vehicles, there is usually provided a watertight body in which is situated the driving motor and seats or space for the occupants, and extending longitudinally of the body on each side thereof, are a pair of endless type tracks which usually extend between a pair of spaced rollers, one of the latter being a driving roller, while the other is an idler. The weight of the vehicle is usually supported on a plurality of longitudinally spaced and aligned bogies which rollably engage the lower run of the track. When the vehicle is used upon land, both tracks are usually driven at the same speed for straight ahead movement. However, when it is desired to turn one way or the other, one track is slowed with reference to the other track either by braking or by reducing the applied power, and the vehicle changes direction. During the turn, both tracks have to skid or deflect horizontally. In rigid tracks, the skidding action causes the tracks to dig in. It will be appreciated that where this manoeuvre is carried out on rough shingle, the tracks will be heavily abused and therefore must necessarily be of extremely strong construction.

Referring now to the drawings, the numeral 10 generally designates one embodiment of the invention comprising a vehicle having a watertight body 11 which is supported on either side by endless type tracks herein accorded the numeral 12, one only of which is illustrated as both are identical.

At the after end of the body is a V-type driving pulley 13 which is connected to a motor, not shown, and at the forward end of the body is a V-type idler pulley 14. Between these pulleys are located a plurality of longitudinally spaced and aligned bogies 15, the latter being of a type to accept a V-type pulley belt and are rotatably journalled on axles 16 which may be rigidly secured to the body 11 or may be spring suspended therefrom for independent vertical movement.

Stretched between and passing over pulleys 13 and 14 is a V-type flexible endless belt 18, the lower run 19 of which serves as a supporting track for the bogies 15. This V-type belt 18 has a trapezoidal section and serves as a carrier for a plurality of transversely extending slats 22.

The slats 22 are arranged on the belt 18 so that they extend equidistantly on either side thereof and are fastened to the belt by means of a pair of spaced machine bolts 23, the connection providing a certain slight radial flexibility of the slats relative to the belt. The slats also lie close to but not in touching engagement with each other so as to provide a substantially continuous travelling surface, and serve as platforms for a plurality of pontoons 24 which are secured thereto for movement therewith.

These pontoons are of the resilient inflatable type and, when inflated, present a central elongated cylindrical body portion 25 and rounded end portions 26 and 27, the portion 26 being entitled the upper rounded portion and the portion 27 being entitled the lower rounded portion for purposes of identification. The upper rounded portion 26 is formed of soft rubber and the lower rounded portion 27 of a hard rubber, both portions being vulcanized to the body portion 25, the latter being of light rubber covered fabric hose or the like. The rounded upper portion 26 is also provided centrally thereof with a filling valve 28 by means of which the pontoons may be inflated with compressed air to a predetermined pressure.

Secured to the body portion 25 of each pontoon, is a tethering harness 28. This harness is preferably formed of a length of non-stretchable material, such as heavy canvas, and is formed having a pair of rectangularly shaped elongated end sections 29 of the same length as the cylindrical body portion 25, and a central portion 30 which is formed as a pair of spaced straps which, when the tethering harness is fitted to the pontoons, extends over the rounded upper end portion 26 thereof. The end sections 29 are secured to the body portion 25 by vulcanizing or by the application of a suitable cement, the central portion 30 lying free of said rounded upper portion 26. The pontoons are secured to the slats by passing each slat between the straps 32 and the rounded upper section 26 of each of them, the fit being such that said portion 26 is slightly deformed, being drawn by means of the straps against the surface of the slat. The straps 32 are then each secured to the slats by means of machine bolts 37. It will be seen that the pontoons will be pulled by means of the tethering harness 28 into a position relative to the slat to which it is connected so as to extend outwardly from the latter, the longitudinal axis of the pontoons being normal to the planar surface of the latter and, in view of the fact that the rounded upper portions 26 of the pontoons have been deformed, said pontoons will resiliently resist both lateral and longitudinal deflection from their normal position.

The diameter of the cylindrical body portions 25 of the pontoons is equal to the width of the slats so that the pontoons will also lie adjacent to but not quite touching each other, and a plurality of each of them, in this case four, are connected in transversely extending groups to each of the slats in closely adjacent but not quite touching relationship to each other. It will be seen that in the event of forces acting upon the vehicle, either laterally or longitudinally, any deflection of the pontoons from their normal position will be resisted not only by the restraining action of the tethering harness, but by the engagement of one pontoon with the pontoon adjacent as they try to deflect under these forces. It will be appreciated, however, that the pontoons will deflect from the normal position until the restraining action of the tethering harness combined with the restraint against deflection caused by engagement of the pontoons with each other, overcomes the applied deflecting force.

In operating the vehicle on land, the pontoons not only provide exceptional ground gripping qualities, but are sufficiently flexible so as to prevent racking of the truck structure and the vehicle. In changing direction of the vehicle on land, the operator thereof will follow the same procedure as with most crawler type vehicles, that is, applying the brakes to one track while permitting the other one to drive. However, due to the individual flexibility of each of the pontoons, neither of the tracks will skid but will in effect walk themselves around a vertical axis.

This walking action is best illustrated with reference to FIGURE 3 in which is shown the forward end of one of the tracks during turning movement in the direction as shown by the arrow 40. As the vehicle during its turn rotates about a vertical central axis, the front and rear ends of the tracks will likewise rotate in opposite directions about said axis. In the standard track, the link components thereof will of course be required to skid over the surface of the ground being travelled upon, the skidding motion quite often being accompanied by a digging into the ground surface if the latter is a soft sand or the like. In the track of the present invention, however, the pontoons at the forward end of the track at the time in contact with the ground, will deflect laterally, permitting a shift of the forward end of the track in the direction as shown by the arrow. The group of pontoons next to engage the ground will of course extend outwardly from the slats to which they are secured normal to the latter's surface, and will engage the ground surface ahead of but deflected out of the path of the pontoons which follow. This latter group of pontoons will of course deflect and the group following will engage the ground surface again ahead of but deflected from the path of the group which it follows. The deflection of the pontoons is not of course accompanied by skidding thereof, but each pontoon simply rolls on its rounded lower end 27 and, by reason of the flexible nature of said rounded end, will not tend to dig in if the ground surface should be of soft sand. It will be appreciated that during a turn a number of the supporting pontoons will be required to deflect longitudinally of the track. This latter deflection will, by reason of the rounded lower ends of the pontoons, permit the latter to roll rather than skid. This same action will occur where a rough shingle is to be traversed, the individual resiliency of each of the pontoons permitting each of them to adjust itself to the roughness of the ground traversed.

The pontoons, when the vehicle is to be operated in water, provide the tractive force required for driving the vehicle through the water. These pontoons also, depending upon their size and the entire weight of the vehicle, may retain the body of the vehicle above the surface of the water, thereby eliminating the need for expensive watertight construction of the body and, consequently, permitting material reduction in the overall weight of the vehicle. The reduction in weight will of course result in a reduced wetted area and consequent reduction in water friction.

It will be appreciated that, in the foregoing description, the flexibility of movement of each of the pontoons has been obtained through the flexible nature of its carcass rather than providing flexibility of the tethering harness 28. Consequently, the means whereby the pontoons are fastened to the slats may be varied depending upon the circumstances under which the vehicle is to be used.

In FIGURE 5, there is shown another embodiment 41 of the invention in which the means of tethering the pontoons only is shown as the embodiment 41 is in all other respects identical to embodiment 10. Embodiment 41 includes slats 42, the latter being similar to slats 22 of embodiment 10 to which are secured pontoons 44 spaced therealong in the manner that the pontoons 24 are spaced on said slats 22. The pontoons 44, one of which is shown in FIGURE 5, have rounded upper ends 45 of relatively thick rubber or like resilient material and extending centrally therefrom are filler valves 46 having elongated externally threaded stems 47. The stems 47 of each of the valves extends through suitable apertures 48 formed in the slats 42, and are threadedly engaged by nuts 50 by means of which said upper ends 45 may be drawn tightly against said slats. The pontoons 44 will naturally tend to assume the position in which their longitudinal centre line extend normal to the slats to which they are attached and will resist any forces tending to cause lateral or longitudinal deflection in the same manner as do pontoons 24.

What I claim as my invention is:

1. Track apparatus for crawler type vehicles comprising an endless travelling surface, a plurality of individually inflatable members arranged in longitudinally spaced alignment around the surface, each of said members having a convex resiliently deformable surface engaging portion, means for individually tethering the inflatable members to said surface for travel therewith, said means being arranged to draw said surface engaging portions into deformed engagement with said surface, thereby yieldably restraining said members against lateral and longitudinal deflection.

2. Track apparatus for crawler type vehicles comprising an endless travelling track having longitudinally spaced outer planar surface sections, a plurality of individually inflatable members arranged around the track at each section, said members each having a convex resiliently deformable section engaging portion, means for individually tethering the inflatable members to said track for travel therewith, said means being arranged to draw each said section engaging portion into deformable engagement with its associated section, thereby yieldably restraining said members against lateral and longitudinal deflection.

3. Track apparatus as claimed in claim 2 wherein the tethering means of each member comprises a pair of elongated looped straps extending in spaced parallel direction over the deformable sections and secured at the opposite ends to the inflatable members, said means rigidly securing the straps to the track.

4. Track apparatus for crawler type vehicles comprising an endless travelling track, a plurality of longitudinally spaced transversely extending rigid platforms connected to the track for travel therewith, said platforms having planar outer surfaces, a plurality of transversely spaced individually inflatable members arranged in a transversely extending row at each platform, each of said members having a convex resiliently deformable platform engaging surface, means for individually tethering each member to its associated platform, said means being arranged to draw said deformable portions of the members into deformed engagement with the outer surfaces of the platforms, thereby yieldably restraining said members against lateral and longitudinal deflection.

5. Track apparatus as claimed in claim 4 wherein the tethering means of each member comprises a pair of elongated looped straps extending in spaced parallel direction over the deformable sections and secured at the opposite ends to the inflatable members, said means rigidly securing the straps to the platform.

6. Track apparatus for crawler type vehicles comprising an endless travelling V belt, a longitudinally spaced series of transversely extending elongated slats secured at the said points thereof to the belt for travel therewith, said slats having planar outer surfaces, a plurality of elongated individually inflatable members each having a rounded resiliently deformable end section arranged in side by side relationship along each slat and having the longitudinal axes normally extending perpendicularly to the outer surface of the slats, means on each member for tethering each to its associated slat, said means being arranged to draw the deformable end sections of each member into deformed engagement with its said associated slat, thereby yieldably restraining said members against lateral and longitudinal deflection from their normal position.

7. Track apparatus as claimed in claim 6 wherein the tethering means of each member comprises a pair of elongated looped straps extending in spaced parallel direction over the deformable sections and secured at the opposite ends to the inflatable members, said means rigidly securing the straps to the platform.

8. Track apparatus as claimed in claim 6 wherein each of the slats is provided with a plurality of spaced apertures wherein said tethering means includes an elongated valve stem extending from the deformable end section of each of the inflatable members insertable into one of the apertures, and nut means threadedly engageable with each of the stems engageable with the slat to draw said deformable end section into engagement with the planar outer surfaces thereof.

References Cited by the Examiner
UNITED STATES PATENTS 2,306,577 12/1942 Walker _____ 305—34

MILTON BUCHLER, *Primary Examiner.*

A. H. FARRELL, *Assistant Examiner.*